F. H. DE BRÜINE.
METHOD OF RANGING A RAPIDLY MOVING OBJECT AND APPARATUS THEREFOR.
APPLICATION FILED MAY 11, 1920.

1,420,913.

Patented June 27, 1922.
3 SHEETS—SHEET 1.

F. H. DE BRÜINE.
METHOD OF RANGING A RAPIDLY MOVING OBJECT AND APPARATUS THEREFOR.
APPLICATION FILED MAY 11, 1920.

1,420,913.

Patented June 27, 1922.
3 SHEETS—SHEET 2.

Inventor
Frederik Hendrik de Brüine
By B. Singer
Atty

F. H. DE BRÜINE.
METHOD OF RANGING A RAPIDLY MOVING OBJECT AND APPARATUS THEREFOR.
APPLICATION FILED MAY 11, 1920.
1,420,913.
Patented June 27, 1922.
3 SHEETS—SHEET 3.
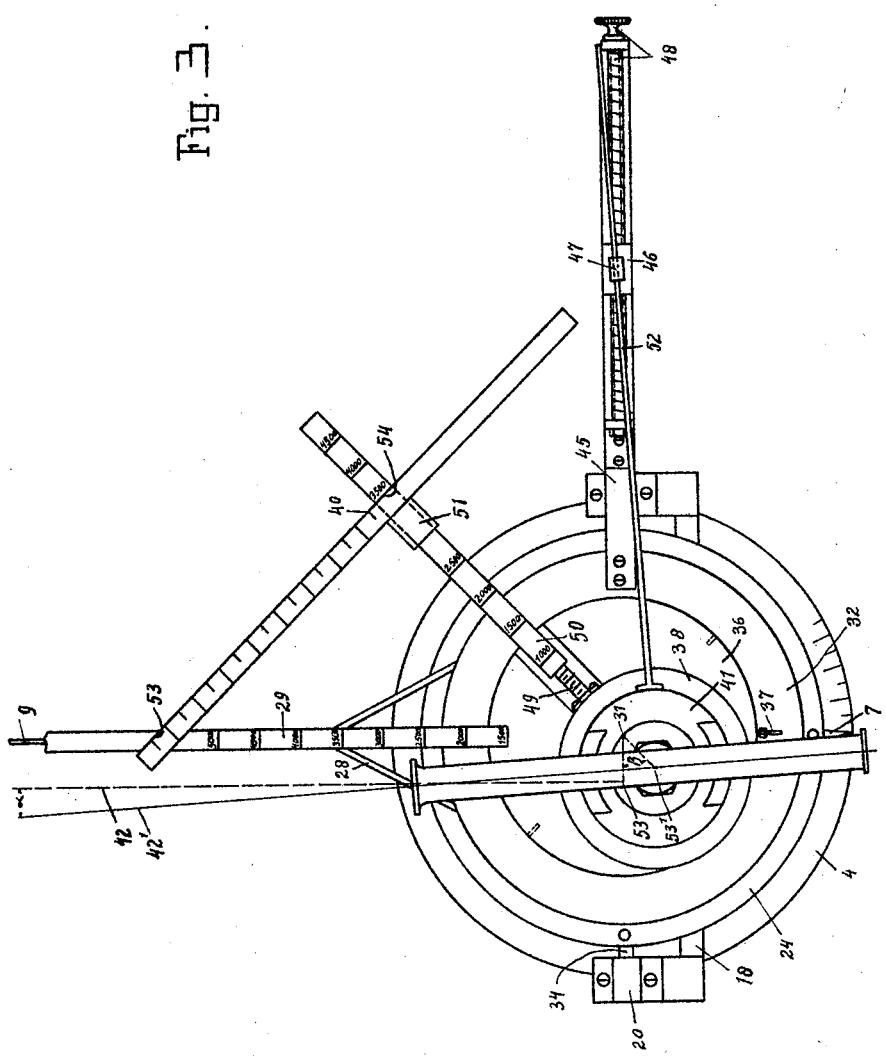

UNITED STATES PATENT OFFICE.

FREDERIK HENDRIK DE BRÜINE, OF BANDOENG, JAVA, EAST INDIES.

METHOD OF RANGING A RAPIDLY-MOVING OBJECT AND APPARATUS THEREFOR.

1,420,913.     Specification of Letters Patent.    Patented June 27, 1922.

Application filed May 11, 1920. Serial No. 380,648.

*To all whom it may concern:*

Be it known that I, FREDERIK HENDRIK DE BRÜINE, a citizen of the Kingdom of the Netherlands, and resident of Bandoeng, Java, Netherlands' East Indies, have invented certain new and useful Improvements in a Method of Ranging a Rapidly-Moving Object and Apparatus Therefor (for which I have filed an application in Netherlands' East Indies November 7, 1918, No. 124 Ind.), of which the following is a specification.

The invention relates to an improved sighting apparatus for use in ranging for gunnery an aeroplane or other rapidly moving object, and has for its main purpose to provide improved means to enable the observer to obtain more quickly than by other means now existent the indications which are required for corrections as to deflection and to elevation, that is, in a lateral and a longitudinal direction, due to the displacement of the object being fired at during the flight of the projectile.

A further object is to provide means whereby corrections are automatically made in the battery sighting apparatus.

A still further object is to have the quadrant angles (formed between the line of sight and the direction of the axis of the gun) and the timings of the fuse, both corrected in connection with the groundangles (formed by the line of sight and a horizontal line) visually indicated on a scale or other indicia of the instrument.

For these purposes I make use of a plane hereinafter termed the plane of flight, which passes through the direction wherein the aeroplane or other target moves and the line of sight. This plane is located in the instrument during the period of sighting and aiming at the object for example by means of a telescope or the like which can rotate around an axis vertical or perpendicular to the plane of flight mentioned above. For ascertaining the corrections to be made the line is determined which in this plane has the greatest elevation to the horizontal plane. When the direction of this line is fixed and also the line directing to the object, the shortest distance to the direction wherein the aeroplane moves is easily found.

The method results in accurate fire with indirect sighting by the battery commanding officer, which from the first indications determines the distance on which the firing shall be opened.

A means of carrying the invention into effect is seen in Figs. 1 and 2 of the accompanying drawings:—

Fig. 3 is a diagram explaining the way in which the corrections are automatically indicated in the sighting device.

Figure 1:
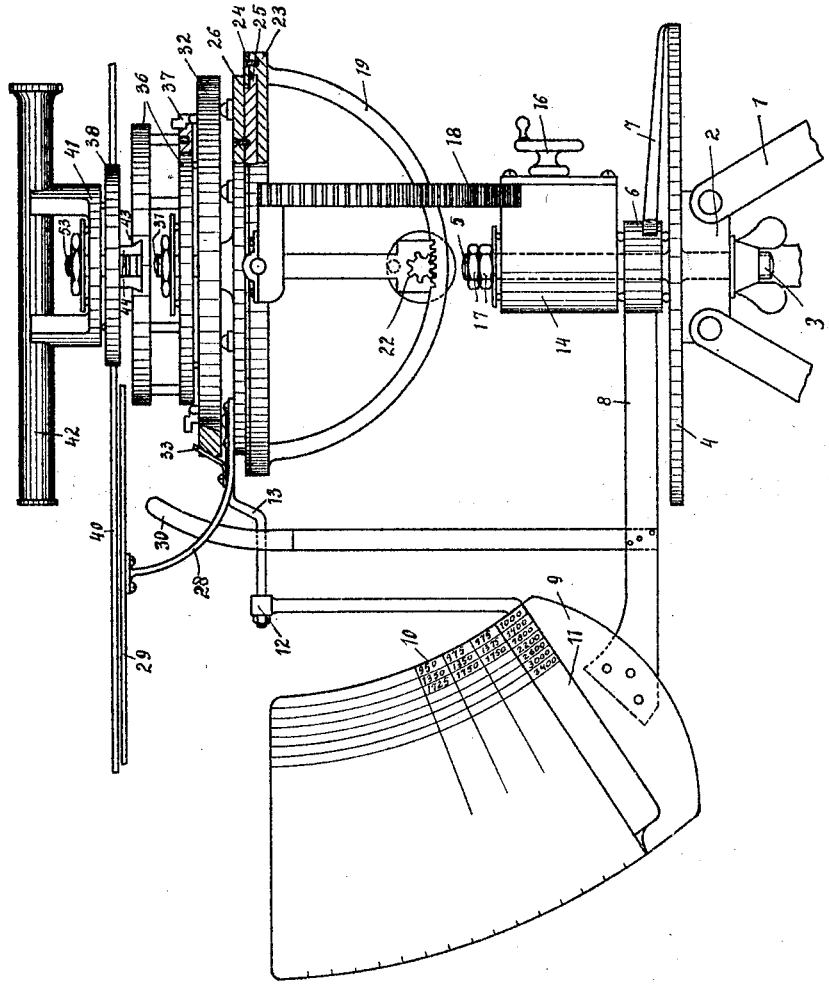
Fig. 1 is a sectional elevation of one example of an apparatus for the application of the aforesaid method.

In Fig. 1, 1 are the feet of the tripod on which the instrument is mounted, rotatable over the spindle 2 on which the base 3 of the table 4 may be fixed by a terminal screw. The boss 6 which bears the indicator 7 and the arm 8 is lightly rotatable mounted over the axis 5 just as the house 14, both being locked by means of the screw-nuts 17.

As illustrated in Fig. 1 of the drawings a device is shown by means of which the groundangles and the quadrantangles and the timing of the fuse of the projectile by the sighting of the telescope are indicated. This device consists of a plate 9 on both sides of which thin plates 10 are fixed with indications thereon which differ for the different fire-arms to be used and have correction distance-indicia and the correction numbers for the timing of the fuse. Over the plate 9, which follows the horizontal movement of the telescope, is a double forked pointer 11 which also follows the movement of the telescope but in a vertical direction. By the extremity of one of the sides of the pointer the ground angle is indicated at the outer edge of the plate 9. The pointer 11 is fixed rotatably at 12 to the arm 13, which is bent to bring 12 in the axis of the segment 18.

When the telescope is directed or aimed at the object and the latter is at a distance of say 4000 meters one reads next to the number 4000 by means of the pointer 11, the corrected distance on plate 10, and at the other side of 9 the corrected timing of the fuse of the projectile.

Figure 2:
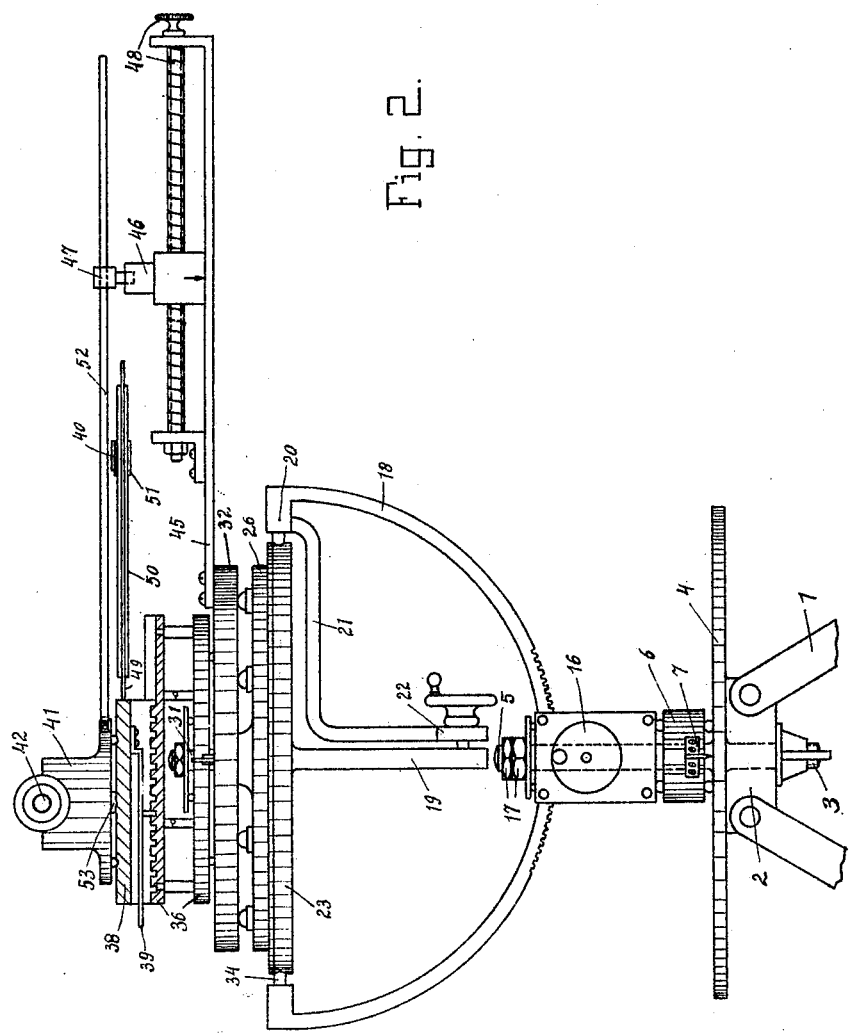
Fig. 2 is a sectional elevation taken at right angle to Fig. 1, of the upper part of the apparatus on the axis of the telescope mounting.

Referring now to both Figs. 1 and 2, means are also provided for locating in the instrument the plane of flight, that is the plane comprising the line which connects the apparatus with the object and the course or line of flight of the object, said means consisting of two segments 18 and 19. By means of an adjusting device 22 connected by means of the arm 21 to one of the bearings 20 of the outer segment 18 the plane of the plate 23 by rotating in the journals 34 is directed to the object, the telescope 42 being sighted at the object the lateral movement being executed in turning the whole upper part of the apparatus around the shaft 5 (Figure 1) over the table 4; further the plate 23 by means of the adjusting device 16 is so far turned around the line of sight, that the object as seen in the telescope 42 moves along the hair-line in the optical field of the telescope.

The arrangement is such that the object after the instrument has once been brought into the right position, that is the plane of flight, can be followed with the telescope by turning same around an axis at right angles to the flying plane, which movement is followed by the pointer 11 and the forked arm 30.

When the pawl 37 is turned upward as seen by the position of the right hand pawl in Fig. 1, the telescope is connected with a disc consisting of two plates 25 and 26 fixed together which lie in the plane of flight and can turn around a spindle 31 with regard to the plate 23, upon which they are held by the flat ring 24. Further on will be explained why the telescope 42 and its support 41 cannot in that case turn around the axle 53.

The device for automatically ascertaining the corrections, which must be obtained in both the horizontal and the vertical direction and which in this case appear from one single correction in the direction of the movement of the object to be fired at, that is in the plane of flight, consists of the rotatable disc 36, the interposed member 38, the arm 45, fixed to the rotatable disc 32, the rod 52 and the support 46, 47. The interposed member 38 can slide by means of a dovetail (Fig. 1) in the disc 36, and this member 38 can, by means of a spring pawl 39, be fixed in different eccentric positions to the disc 36, visible by the pointer 43 of the disc 36 on the scale 44, of the member 38.

By means of the arm 45 fixed to the disc 32 and the block 46 adjustable by means of the screw 48, the support 47 is traversed and then held in a fixed direction and at a predetermined distance from the axis of the disc 32. The rod 52 is fixed to the telescope, at right angles to the line of sight but is slidable in the support 47.

As the flying plane or other target has a certain inclination equal to that of the disc 36, the weight of the interposed member 38 and of the support of the telescope and the parts connected thereto when released by turning down the pawl 37 will turn the disc 36 until the axial line of the spindles 53—31 occupy the greatest possible inclination.

As the bar 52 at the same time will turn slightly around the axis of 47 wherein as before mentioned it can slide, and as the bar 52 remains always at right angles to the axis of the telescope 42, it will be clear, that this axis will turn through an angle α which angle is determined by the angle ε and the distances 53—31 and 31—47.

The correction to be made depends upon the direction of the flight, the velocity of the object, the time which the projectile requires to reach the object, and the distance.

The angle α increases with the increment of the angle ε, till ε has reached 90° and decreases upon a further increment of ε. The correction undergoes corresponding alterations according to the increment of the angle between the direction of flight indicated in the instrument by the line 55—54, and the line of sight of the instrument (55—31) which angle is equal to the angle ε. It is here supposed that the direction of the flight is horizontal. During the following of the object with the telescope the arm 45 is turned, the scale 29 moves in accordance with that arm owing to the connection by means of the supports 28 (Fig. 1), the disc 36, the pawl 33 and the disc 32, while the scales 40 and 50 are not displaced.

The angle α increases with the increment of the distance 53'—31, while the correction correspondingly increases with the increment of the velocity of the object.

The angles α increases in proportion with the decrement of the distance 31—47; the correction increases when the distance becomes smaller, but decreases when the time for the flight of the projectile becomes less. This time of flight and this distance (range) depends upon each other in a particular manner, which is different for any kind of gun. Therefore with a certain kind of gun, these both factors influence the said correction on a determined manner, which is easiest reckoned with by indicating distances (ranges) on the scale along the arm 45, which scale must be removable, as another kind of gun needs another scale. It is clear, that the indicia on the arm 45 must be placed in such a manner, that the relative displacement of the support 46, 47, have the same influence on the angles as the time of flight and the distance (range) for that particular kind of gun influence together the said correction.

Summarizing the angle α is determined by the angle ε, the distance 53'—31 and the distance 31—47 while the correction correspondingly is determined by the direction of the flight, the velocity of the flight and the distance for each sort of gun affixed on a different scale along 45 according to the time, which the projectile requires to reach the object.

When the right proportion has been fixed between the scale at 44 (Fig. 1) corresponding with the different velocities of the object and scale along 45, then it is clear that the angle $\alpha$ with great accuracy is equal to the correction, which thus is automatically given.

A further device is provided by means of which during the following of the object with the telescope, so long as the direction of the movement of the object remains the same, the distance can always be read and the velocity of the object can be measured.

The device consists of the before described correction device and the measuring rods or scales, 29, 40 and 50.

The drawings are given for an object moving from left to right otherwise the arm 45 must be situated at the other side of the instrument. Therefore the spring pawl 33 is put outwards and the telescope turned on its seat.

As soon as the instrument is put in the right position, the distance is read off on a distance meter and at that moment the following of the object is stopped, whereupon the catch 37 is turned down and the interposed member 38 occupies a position as indicated in Fig. 3 and the rod 50 is now in the position indicated in Fig. 3.

If the operator moves the sleeve 51 in such a way over rod 50 that the front edge of the scale 40 near the line 55 is positioned at the same level as the given distance, then 31—54 represents the distance to the line of the flight. The rod 50 must of course be connected to the rod 49 in such a way that the distance from 31 to the numeral 1000 represents exactly 1000 meters in the accepted graduation; therefor the rod 49 has a scale according to the scale 44.

If then the object is followed with the telescope by turning the arm 45 we can at all times read off at 55: (1) the distance to the object while the axis of the telescope corresponds to the line 42, (Fig. 3) (the pawl 37 being during the following turned up and subsequently released), and (2) the distance to the intersection point between the object and projectile (point of impact), while the automatic correction device is in action (catch 37 being released) and the axis of the telescope is in the position of the line 42′.

It will be clear that with the use of a watch and with the aid of the scale on the rod 40 the velocity of the object can be determined.

By the automatic application of the correction, the axis of the telescope 42 is no longer directed to the object. In moving the arm 45 over a certain distance this can be obtained, but then is the line of sight (42 or 31—55) directed to the place where the object and the projectile have to meet (point of impact) and for this place the corrections had to be found.

By the movement of the arm 45 the correction is we can say analysed into a lateral and a longitudinal correction and transmitted to the scales on the table 4 and on the plate 9.

After the distance on which the object will be first fired at has been chosen, the arm 45 is turned until this distance is indicated at 55; and after the indications for that position have been communicated to the gun-layer, the arm is turned back and the object followed till the front edge of the scale 40 reaches the scale number on 29 which corresponds with the chosen distance; at that moment "fire" is commanded, so that the projectile is fired at the correct moment indicated for the chosen distance to make a correct hit on the point of impact.

The apparatus as described is only an example of the way in which the said method may be executed.

Having fully described my invention, what I claim is:

1. Sighting apparatus comprising a base, a table thereon, an element pivotally mounted on the base for horizontal angular movement and having a pointer and an arm extending in opposite directions; a vertical plate carried by the said arm and having correction distance indicia and timing fuse correction numbers thereon; a pivotally mounted member whose pivot is coaxial with that of the said element, a plate, a segment in which said plate is mounted for vertical angular movement, said segment being mounted on said member for vertical angular adjustment to correspondingly incline said plate; a segment at right angles to the first-named segment, adjusting means for the last named segment, connecting the same to the first-named segment to enable said plate to be vertically adjusted in a plane at right angles to the first-named segment; a disc mounted for concentric angular movement on said plate, a radial measuring arm having a scale and carried by said disc; a second disc mounted for concentric angular movement on the first-named disc and having a radial arm; pointers carried by the first-named disc and coacting with the indicia and numbers on the said vertical plate; a rotatable disc for automatically ascertaining the corrections, mounted on the second named disc, an interposed member shiftable eccentrically on the said rotatable disc; a radial scale arm carried by said interposed member, a scale arm slidably mounted on said last-named scale arm and arranged at right angles thereto and shiftable on said measuring arm; a telescope-mounting member mounted for angular movement on said interposed member and having a radial bar adjustably connected to said radial arm, and a telescope on said mounting member and at right angles to said radial bar.

2. In a sighting apparatus, the combination of a plate mounted for universal angular movement and provided with adjusting means; a vertical plate mounted for concentric horizontal angular movement with respect to said plate, means to indicate the position of said vertical plate, a pointer co-acting with said vertical plate, carrier means for said pointer mounted for concentric rotation on the first-named plate, a radial measuring arm also carried by said carrier means, a telescope mounted for turning movement and also for eccentric movement with respect to said plate, adjusting means for moving the telescope angularly with respect to said plate, a radial scale arm movable eccentrically with the telescope, and a scale arm at right angles to and shiftable on said radial scale arm and also shiftable on said measuring arm.

In testimony whereof, I have signed my name to this specification in the presence of two subscribing witnesses.

FREDERIK HENDRIK de BRÜINE.

Witnesses:
  J. B. GILL,
  TJRONG KIM TJIANG.